US010051717B2

(12) United States Patent
McKay et al.

(10) Patent No.: US 10,051,717 B2
(45) Date of Patent: Aug. 14, 2018

(54) ELECTROSTATIC NOISE GROUNDING SYSTEM FOR USE IN A WIND TURBINE AND A ROTOR AND WIND TURBINE COMPRISING THE SAME

(71) Applicant: SCHUNK GRAPHITE TECHNOLOGY, LLC, Menomonee Falls, WI (US)

(72) Inventors: Kenneth McKay, Fond du Lac, WI (US); Robert Hefner, Sussex, WI (US)

(73) Assignee: SCHUNK CARBON TECHNOLOGY, LLC, Menomonee Falls, WI (US)

(*) Notice: Subject to any disclaimer, the term of this patent is extended or adjusted under 35 U.S.C. 154(b) by 0 days.

(21) Appl. No.: 14/379,159

(22) PCT Filed: Aug. 8, 2014

(86) PCT No.: PCT/US2014/050364
§ 371 (c)(1),
(2) Date: Aug. 15, 2014

(87) PCT Pub. No.: WO2016/022150
PCT Pub. Date: Feb. 11, 2016

(65) Prior Publication Data
US 2017/0150587 A1 May 25, 2017

(51) Int. Cl.
H05F 3/02 (2006.01)
F03D 1/06 (2006.01)
(Continued)

(52) U.S. Cl.
CPC ............ H05F 3/02 (2013.01); F03D 1/0675 (2013.01); F03D 80/30 (2016.05); H01R 39/08 (2013.01); H01R 39/26 (2013.01); H02K 7/183 (2013.01)

(58) Field of Classification Search
CPC .......... F03D 1/0675; F03D 80/30; H05F 3/02; H02K 7/183; H01R 39/08; H01R 39/26
See application file for complete search history.

(56) References Cited

U.S. PATENT DOCUMENTS 1,940,554 A     12/1933 Malinovszky
4,449,053 A *   5/1984 Kutcher ................. F03D 80/70
                                                    290/44
(Continued)

FOREIGN PATENT DOCUMENTS

DE        20319600 U1      3/2004
DE     102004022299 A1    12/2005
(Continued)

OTHER PUBLICATIONS

International Search Report and Written Opinion for International Application No. PCT/US2014/016520 dated Nov. 3, 2014.
(Continued)

Primary Examiner — Igor Kershteyn
(74) Attorney, Agent, or Firm — Husch Blackwell LLP

(57) ABSTRACT

Disclosed herein is a wind turbine rotor which includes a plurality of blades and a hub root, wherein at least one blade is provided with at least one electrostatic noise grounding system. The electrostatic noise grounding system includes an insulated rod having a first end and a second end, a conductive core passing through the insulated rod, a first conductive element connected to the conductive core at the first end of the insulated rod, and a second conductive element competed to the conductive core at the second end of the insulated rod. The electrostatic noise grounding system is secured to a portion of the rotor (e.g., blade bearing housing or blade bearing housing bolted connection) such that the first conductive element is in direct physical contact with at least a portion of the surface of at least one blade and
(Continued)

the second conductive element is in direct physical contact with at least a portion of the surface of the hub root.

26 Claims, 6 Drawing Sheets

(51) Int. Cl.
*F03D 80/30* (2016.01)
*H01R 39/08* (2006.01)
*H01R 39/26* (2006.01)
*H02K 7/18* (2006.01)

(56) References Cited

U.S. PATENT DOCUMENTS

| | | | |
|---|---|---|---|
| 4,625,256 A | 11/1986 | Scuka et al. | |
| 5,716,193 A * | 2/1998 | Mondet | B64D 45/02 |
| | | | 244/1 A |
| 6,407,900 B1 | 6/2002 | Shirakawa et al. | |
| 6,612,810 B1 | 9/2003 | Olsen et al. | |
| 6,979,179 B2 * | 12/2005 | Møller | F03D 80/30 |
| | | | 415/4.3 |
| 7,040,864 B2 * | 5/2006 | Johansen | H02G 13/00 |
| | | | 416/146 R |
| 7,249,935 B2 * | 7/2007 | Pedersen | F03D 80/30 |
| | | | 416/146 R |
| 7,377,750 B1 | 5/2008 | Costin et al. | |
| 7,390,169 B2 | 6/2008 | Larsen et al. | |
| 7,502,215 B2 | 3/2009 | Krug et al. | |
| 8,081,414 B2 * | 12/2011 | Llorente Gonzalez | F03D 1/065 |
| | | | 361/220 |
| 8,133,031 B2 | 3/2012 | Arinaga et al. | |
| 8,182,227 B2 * | 5/2012 | Jacobsen | F03D 1/0675 |
| | | | 416/146 R |
| 8,313,295 B2 * | 11/2012 | Olsen | F03D 80/30 |
| | | | 290/44 |
| 8,456,790 B2 | 6/2013 | Tanaka et al. | |
| 8,461,452 B2 | 6/2013 | Munk-Hansen et al. | |
| 8,643,997 B2 * | 2/2014 | Lyngby | F03D 80/30 |
| | | | 361/117 |
| 8,659,867 B2 | 2/2014 | Casazza et al. | |
| 8,727,723 B2 * | 5/2014 | Flemming | H02G 13/00 |
| | | | 416/1 |
| 2003/0170122 A1 | 9/2003 | Wobben | |
| 2006/0013695 A1 | 1/2006 | Pedersen | |
| 2007/0009361 A1 | 1/2007 | Larsen et al. | |
| 2011/0305573 A1 | 12/2011 | Olsen | |
| 2012/0039011 A1 | 2/2012 | Thiel et al. | |
| 2012/0194962 A1 | 8/2012 | Yan et al. | |
| 2012/0269631 A1 | 10/2012 | Lewke | |
| 2012/0282097 A1 | 11/2012 | Lewke et al. | |
| 2013/0181457 A1 | 7/2013 | Lyngby et al. | |
| 2013/0195664 A1 | 8/2013 | Lyngby et al. | |

FOREIGN PATENT DOCUMENTS

| | | |
|---|---|---|
| DE | 102006004902 A1 | 8/2006 |
| DE | 102012205208 B3 | 9/2013 |
| EP | 1577551 A2 | 9/2005 |
| EP | 2336560 A1 | 6/2011 |
| EP | 2369178 A1 | 9/2011 |
| EP | 1568883 B1 | 11/2011 |
| EP | 2520796 A1 | 7/2012 |
| EP | 2482407 A1 | 8/2012 |
| WO | WO2013091380 A1 | 6/2013 |
| WO | WO2013144279 A3 | 11/2013 |

OTHER PUBLICATIONS

International Search Report and Written Opinion for International Application No. PCT/US2014/050364 dated Apr. 15, 2015.

* cited by examiner

ELECTROSTATIC NOISE GROUNDING SYSTEM FOR USE IN A WIND TURBINE AND A ROTOR AND WIND TURBINE COMPRISING THE SAME

CROSS REFERENCE TO RELATED APPLICATION

The present application is the national phase of PCT Patent Application No. PCT/US2014/50364 filed Aug. 8, 2014, the entire content of which is incorporated by reference herein.

STATEMENT REGARDING FEDERALLY SPONSORED RESEARCH OR DEVELOPMENT

None

FIELD OF THE INVENTION

The present disclosure relates to a system to maintain a grounded circuit to reduce the buildup of static charge in the blades of a wind turbine, and more specifically to a rotor of a wind turbine and wind turbine including a system to maintain a grounded circuit to reduce the buildup of static charge in the blades of a wind turbine.

BACKGROUND

Static electricity created during general operation of wind turbines can buildup in the blades of wind turbines, causing communication interference and maintenance safety problems. Communication interference causes the wind turbine to send out alerts of detected problems, whether actual or false, and even shut down. The buildup of static electricity can also cause minor shocks to workers who touch the blades while servicing the wind turbine.

Existing electrical discharge/grounding systems for wind turbines utilize air gaps and are therefore intended to discharge currents large enough to jump the air gap (e.g., lightning). Current air gap style discharge systems are not capable of constantly discharging small currents created by static electricity buildup.

Accordingly, there exists a need for a system which is capable of maintaining a grounded circuit to reduce the buildup of static discharge in the blades of wind turbines which utilize air gap style discharge systems without disrupting the function of existing lightning protection systems and while also bypassing any electric charge from contact with critical elements.

SUMMARY

A wind turbine rotor is disclosed which includes a plurality of blades and a hub root, wherein at least one blade is provided with at least one electrostatic noise grounding system. The electrostatic noise grounding system includes an insulated rod having a first end and a second end, a conductive core passing through the insulated rod, a first conductive element connected to the conductive core at the first end of the insulated rod, and a second conductive element connected to the conductive care at the second end of the insulated rod. The electrostatic noise grounding system is secured to a portion of the rotor such that the first conductive element is in direct physical contact with at least a portion of the surface of the at least one blade and the second conductive element is in direct physical contact with at least a portion of the surface of the hub root.

A wind turbine is disclosed which includes a rotor comprising a plurality of blades joined to a hub root, a nacelle frame, a main shaft extending between the rotor and nacelle frame, and at least one electrostatic noise grounding system. The electrostatic noise grounding system includes an insulated rod having a first end and a second end, a conductive core passing through the insulated rod, a first conductive element connected to the conductive core at the first end of the insulated rod, and a second conductive element connected to the conductive core at the second end of the insulated rod. The electrostatic noise grounding system is secured to a portion of the rotor (e.g., blade bearing housing bolted connection) of at least one blade such that the first conductive element is in direct physical contact with at least a portion of the surface of the at least one blade and the second conductive element is in direct physical contact with at least a portion of the surface of the hub root.

In an embodiment, a method of reducing electrostatic noise in a wind turbine is provided. The method includes a first step of directing electrostatic current from a blade of the wind turbine to a hub root and through a main shaft of the wind turbine and a second step of directing the electrostatic current from the main shaft of the wind turbine to a nacelle frame of the wind turbine.

In an embodiment the step directing electrostatic current from a blade of the wind turbine to a hub root and through a main shaft of the wind turbine includes providing an electrostatic noise grounding system as described herein, and directing current from a blade of the wind turbine to the hub root and through the main shaft via the electrostatic noise grounding system. In an embodiment, the electrostatic noise grounding system includes an insulated rod having a first end and a second end, a conductive core passing through the insulated rod, a first conductive element connected to the conductive core at the first end of the insulated road, and a second conductive element connected to the conductive core at the second end of the insulated rod, and the electrostatic noise grounding system is secured to a portion of the rotor (e.g., blade bearing housing bolted connection) such that the first conductive element is in direct physical contact with at least a portion of the surface of the blade and the second conductive element is in direct physical contact with at least a portion of the surface of the hub root. The step of directing current through the main shaft via the electrostatic noise grounding system therefore includes directing current from the blade through the first conductive element, conductive core, and second conductive element, to the hub root, and to the main shaft.

DETAILED DESCRIPTION

Figure 1:
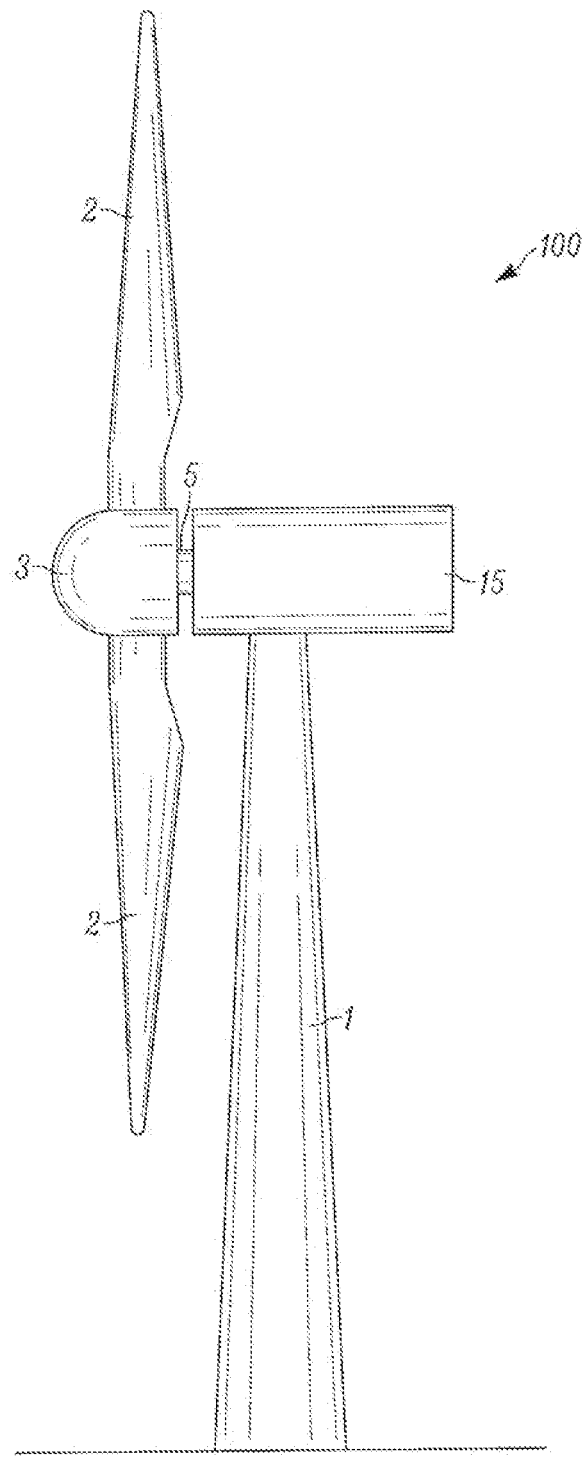
FIG. 1 illustrates an exemplary wind turbine.

FIG. 1 is a high-level overview of a wind turbine 100. In the exemplary embodiment shown, wind turbine 100 is a horizontal axis wind turbine as is known in the art. Wind turbine 100 includes the nacelle frame 15, which houses the various components which convert mechanical energy into electrical energy, held aloft by the tower 1 and rotor 3 which includes the blades 2 and houses the various components which adjust the pitch of the blades 2. The hub root 4 (contained in the rotor 3 in FIG. 1) ties to the main shaft 5 and connects to the energy conversion, components housed within nacelle frame 15. The blades 2 are connected to the hub root 4 (shown in FIG. 2). In the embodiment shown, the wind turbine 100 includes two blades 2. The specific number of blades 2 may vary and a wind turbine 100 may include, for example, two, three, four or more blades 2.

Figure 2:
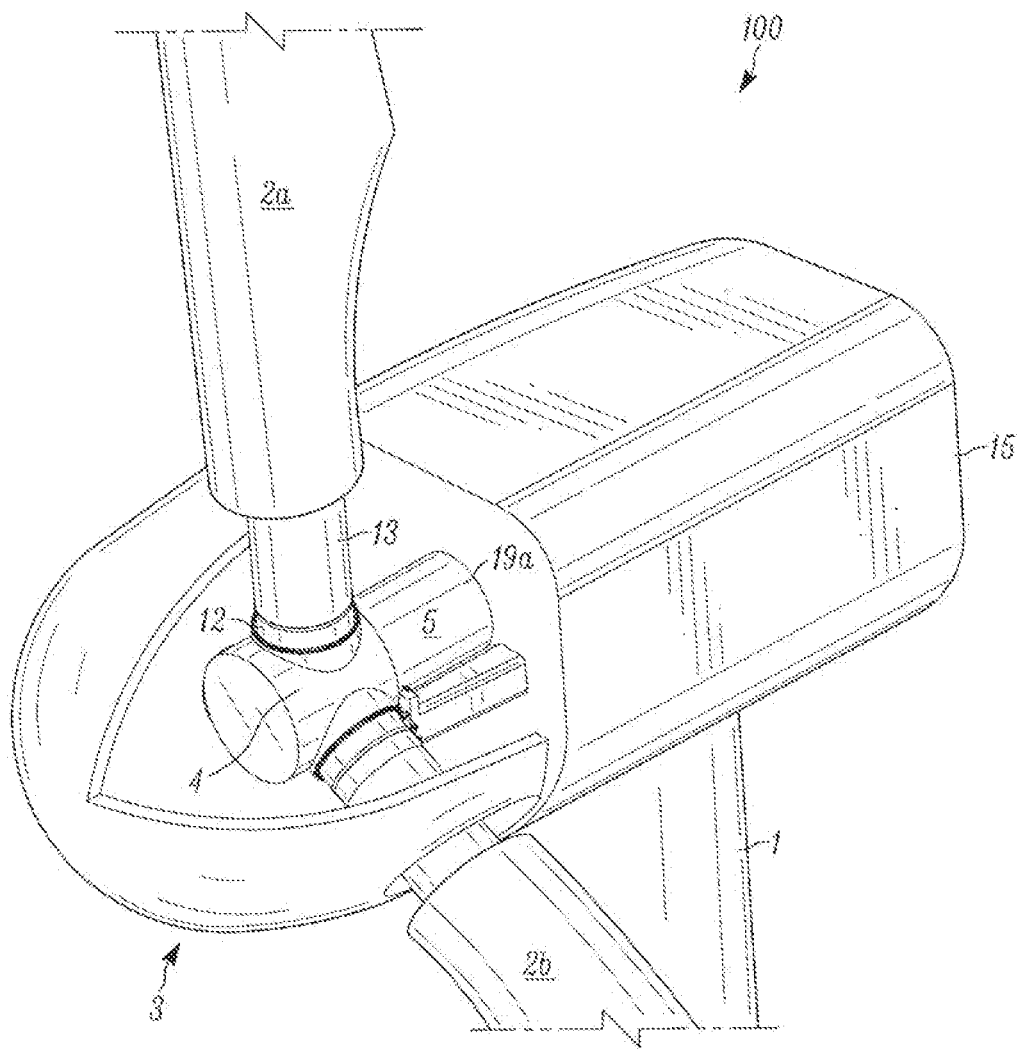
FIG. 2 illustrates the internal components of a rotor and nacelle of a wind turbine.

FIG. 2 illustrates the internal components of the rotor 3 and the junction of the main shaft 5 and nacelle frame 15 of an exemplary wind turbine 100 in further detail. In the exemplary embodiment shown, the wind turbine has three blades 2a, 2b, 2c (hidden from view). The blades 2 are connected to the hub root 4 and are each individually rotatable using blade bearings 17 (not visible) to change the pitch of the blades 2. Blades 2 are connected to blade bearings 17, which are housed by the blade bearing housing 12 at blade roots 13. The main shaft 5 joins the hub root 4 to the internal components housed by the nacelle frame 15. The portion of the main shaft 5 located on the rotor side is the rotor-side 19a of the main shaft 5, and the portion of the main shaft in the nacelle is the nacelle-side 19b of the main shaft 5.

As mentioned above, the nacelle frame 15 houses the various components which convert the mechanical energy of the blades spinning into electrical energy. Typically, the nacelle frame 15 houses at least an electrical generator and a gear box for stepping up the speed of the generator. In other embodiments, the nacelle frame 15 houses an annular generator with a direct drive. In most embodiments, the nacelle frame 15 will also house various sensors, feedback systems and controls for personnel to monitor the stains and function of the wind turbine 100, as well as control the pitch of the blades 2 and rotation of the nacelle frame 15 on the tower 1.

As the blades 2 pivot and the hub root 4 and rotor 3 rotate relative to the nacelle frame 15, static electricity is generated within the blades 2. In order to discharge the static electricity, a system which maintains a grounded circuit must be in contact with a conducting portion of the blades 2 and at least one conducting portion of the nacelle frame 15 to form a conductive pathway to ground for the static electricity.

Figure 3:
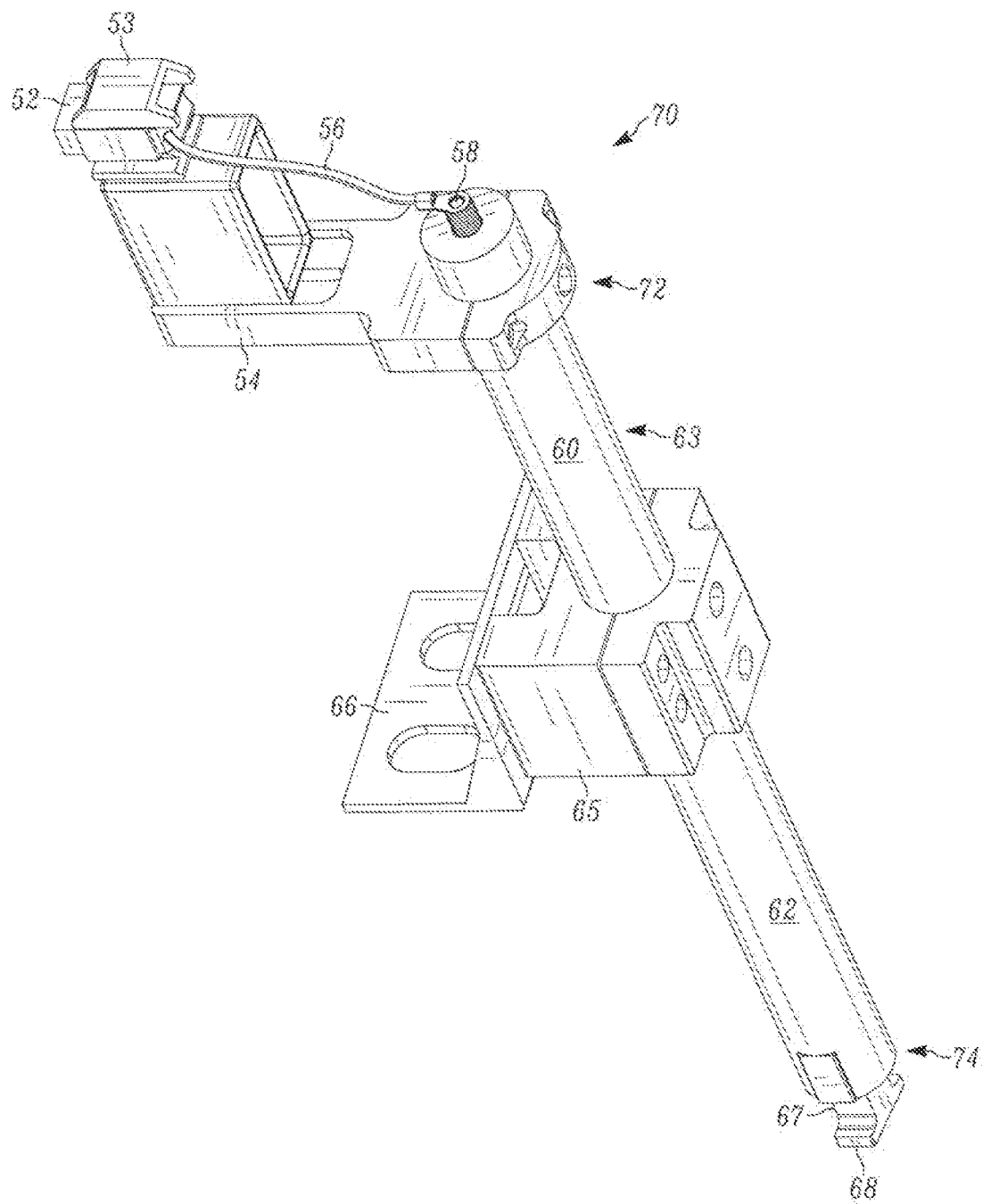
FIG. 3 illustrates an exemplary embodiment of an electrostatic noise grounding system.

FIG. 3 illustrates and exemplary embodiment of an electrostatic noise grounding system (ENGS) 70 for use with a wind turbine 100, such as that shown in FIG. 1. In the exemplary embodiment shown, ENGS 70 includes first conductive element 52 secured in a first holder 53 located at a first end 72 of the ENGS 70. A second holder 67 with a second conductive element is located at a second end 74 of the ENGS 70. As will be shown in detail with reference to FIG. 4, the first element 52 is in direct physical contact with a conductive surface of a blade 2, such as the blade root 13, of the wind turbine 100 (not shown) to conduct built-up static electricity away and towards a ground. The second element 68 is in direct physical contact with a conductive surface of the hub root 4 or main shaft 5 of the wind turbine 100 (not shown) to complete a conductive path to the nacelle frame 15 for the static electricity to follow.

As used herein, the term "direct physical contact" means that at least a portion of a surface of a first object (i.e., a conductive element) physically contacts at least a portion of a surface of a second object (i.e., conductive surface of a blade/blade root) without any intervening material or surface except for an added layer to a surface to improve conductivity (e.g., conductive paint, conductive band, etc.).

In order to provide a conductive path, the material of the first and second conductive elements 52, 68 must be conductive. Preferably the first and second conductive elements 52, 68 are brushes, such as carbon brushes as shown in FIG. 3. In other embodiments, the first and second conductive elements 52, 68 are metal.

An insulated rod 63 joins the first end 72 and second end 74 of the ENGS 70. In the embodiment shown, insulated rod 63 includes an upper insulated rod 60 and a lower insulated rod 62 with a supporting collar 65 located between the first end 72 and second end 74 of the ENGS 70. While in the exemplary embodiment shown, the insulated rod 63 is a single rod containing the upper 60 and lower 62 segments, in further embodiments, the insulated rod 63 may be two separate rods (i.e., upper rod 60 and lower rod 62) physically joined together at the support collar 65.

The insulated rod 63 is made of an electrically insulating material, such as a thermoplastic polyester. In further embodiments, other materials may be used to form the insulated rod 63, provided such materials meet mechanical strength, weather resistance, and thermal stability requirements.

Insulated rod 63 contains a conductive core 58 which runs the length of the insulated rod 63, and the first and second conductive brushes 52, 68 are connected to the conductive core 58 at the first and second ends 72, 74 of the insulated rod 63, respectively. In an embodiment, the conductive core 58 is copper. In other embodiments, however, conductive core 58 may be any material with low resistance. In still further embodiments, the conductive core 58 may be a continuous length of wire passing through the insulated rod 63 and joining the first brush 52 and the second brush 68.

It is important that the insulated rod 63 pass completely through support collar 65 so that the conductive core 58 is completely shielded as it passes through the support collar 65. Completely shielding the conductive core 58 until it reaches the second brush 68 prevents a static charge traveling along the conductive core 58 from jumping to a path of lesser resistance and potentially to a critical component of the wind turbine.

In the embodiment shown, the first conductive element 52 and first holder 53 are joined to the upper insulated rod 60 by way of a step bracket 54. Step bracket 54 allows the first holder 53, and therefore first conductive element 52 to be bold at a distance radially from the upper insulated rod 60. In some embodiments, the step bracket 54 is adjustable so that the first conductive element 52 may be moved closer to or further from the insulated rod 63. In other embodiments, and depending on the specific design of a wind turbine, the first conductive element 52 and first holder 53 may be joined to the upper insulated rod 60 by other mechanical securing means. In still other embodiments, the first holder 52 and insulated rod 63 (or at least upper insulated rod 60) may be a single, inseparable component.

Shunt wire 56 completes the conductive connection between the first conductive element 52 and the conductive core 58. As mentioned above, in other embodiments, the conductive core 58 itself may be a single length of wire which joins the first conductive element 52 and the second conductive element 68. In embodiments in which the step bracket 54 is adjustable, the shunt wire 56 (or, if the conductive core 58 is a single length of wire, the conductive core 58) should be long enough to accommodate the furthest distance between the first conductive element 52 and the insulated rod 63.

In the embodiment shown, the second holder 67 is connected to the lower insulated rod 62 such that the second conductive element 68 is in direct physical contact with the conductive core 58. In alternative embodiments, the second conductive element 68 may be directed threaded into the conductive core 58 to eliminate the need for a second holder 67.

Figure 4:
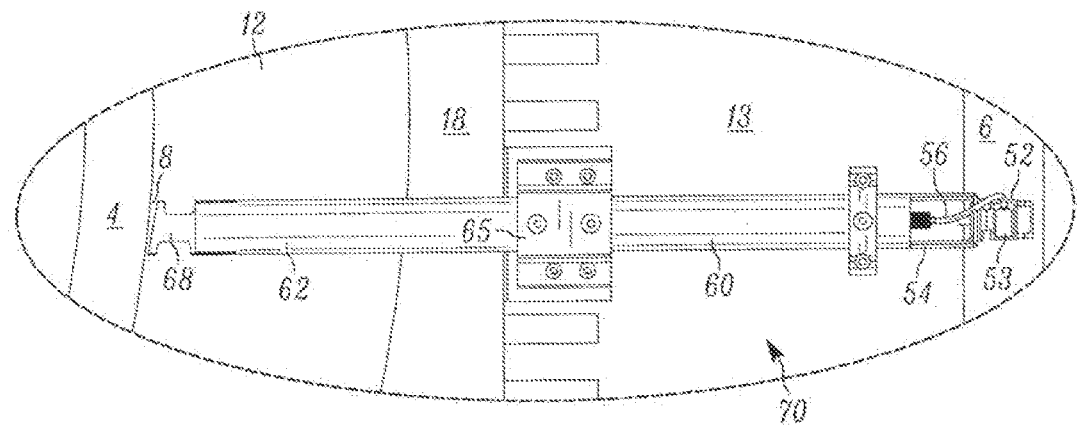
FIG. 4 illustrates an exemplary electrostatic noise grounding system installed with respect to a blade of a wind turbine.

As will be shown in farther detail with reference to FIG. 4, support collar 65 includes securing bracket 66 for securing the ENGS 70 to a structural component of the wind turbine 100, such as a blade bearing housing 12 or blade bearing housing bolted connection 18 (not shown).

FIG. 4 illustrates an exemplary ENGS 70 installed with respect to a blade 2. The securing bracket 66 is secured to the blade bearing housing bolted connection 18. While not preferred, the ENGS 70 may also be secured to a portion of the blade bearing housing 12. The upper insulated rod 60 extends outward from support collar 65 and step bracket 54 extends radially outward from the upper insulated rod 60 at the first end 72 of the ENGS 70 such that the first conductive element 52 is in direct physical contact with at least a surface of the blade 2. In the exemplary embodiment shown, the first conductive element 52 is in direct physical contact with the blade root 13 of the blade 2, specifically. However, in further exemplary embodiments, the first conductive element 52 may be in direct physical contact with an surface of the blade 2.

It is understood that the blade 2 is rotatable at fee blade bearing 17 (not shown), although the blade bearing housing 12 and blade bearing housing bolted connection 18, to which the ENGS 70 is connected, stays stationary with respect to the blade 2. Because the ENGS 70 is secured to the blade bearing housing bolted connection 18, the ENGS 70 will not move relative to the blade 2 when blade 2 rotates. By using a first conductive element 52 as the contact point between the blade 2 and the ENGS 70, the blade 2 remains freely rotatable and movement of the blade 2 is not hindered by the ENGS 70.

In some embodiments, the blades 2 and blade roots 13 of a wind turbine 100 may not have a consistent diameter. In some embodiments, the step bracket 54 or other structure securing the first holder 53 to the ENGS 70 may be automatically adjustable. For example, step bracket 54 may include a structure such as a spring which provides a force in a direction radial from the insulated rod 63 so that the first conductive element 52 is continuously and gently pushed towards the blade 2. When the distance between the blade 2 and the first conductive element 52 decreases, the force of the blade 2 pushing against the first conductive element 52 is greater than the force of the spring causing the first conductive element 52 to move back towards insulated rod 63.

In the exemplary embodiment shown in FIG. 4, blade 2 includes a conductive band 6. The conductive band 6 is a strip of conductive material encircling at least a portion of the blade 2 (or blade root 13) at a height corresponding to the placement of the first conductive element 52. In some embodiments, the conductive band 6 may be a ring of copper or other conductive material which may already be present in conjunction with existing lightning protection systems. In other embodiments, the conductive band 6 may be retrofitted to the blade 2 for purposes of using the ENGS 70. In other embodiments, for example if the blade 2 or blade root 13 is made of a conductive or semi-conductive material, the conductive band 6 may be a portion of the blade 2 or blade root 13 from which paint and dirt has been removed to provide a clean surface.

Lower insulated rod 62 extends inward from support collar 65 such that the second conductive element 68 is in direct physical contact with the hub root 4. Because the ENGS 70 is secured to the hub root 4 at the blade bearing housing bolted connection 18, the ENDS 70 will rotate with the hub root 4 as wind drives the blades 2. As a result, the second conductive element 68 remains in direct physical contact with the same portion of the hub root 4 at all times. Therefore, unlike the first conductive element 52 which requires a conductive band 6 around the blade 2, the second conductive element 68 requires only a conductive portion 8 on the hub root 4.

In order to provide a path to ground for static electricity buildup in the blades 2, the ENGS 70 must be secured to the wind turbine 100 (e.g., shown in FIG. 1) so that the first conductive element 52 is in direct physical contact with a conductive surface of a blade 2. The ENGS 70 must also be secured to the wind turbine 100 such that the second conductive element 68, is in direct physical contact with a conductive surface of a portion of the wind turbine 100 that can conduct current to a ground (or a secondary component which can be incorporated into a path to ground) without passing the current through critical components (e.g., bearings, electrical generator, control systems) of the wind turbine 100. As described above, in the exemplary embodiment shown in FIG. 4, the second conductive element 68 is in direct physical contact with the hub root 4. However, in further exemplary embodiments, ENGS 70 may be designed such that the second conductive element 68 is in direct physical contact with another component of the rotor 3 or nacelle 15, such as the rotor-side 19a of the main shaft 5 or a gutter ring. However, gutter rings typically contain bolts and may not have a uniform diameter, making the gutter ring surface very rough and potentially causing damage to the second conductive element 68.

Figure 5:
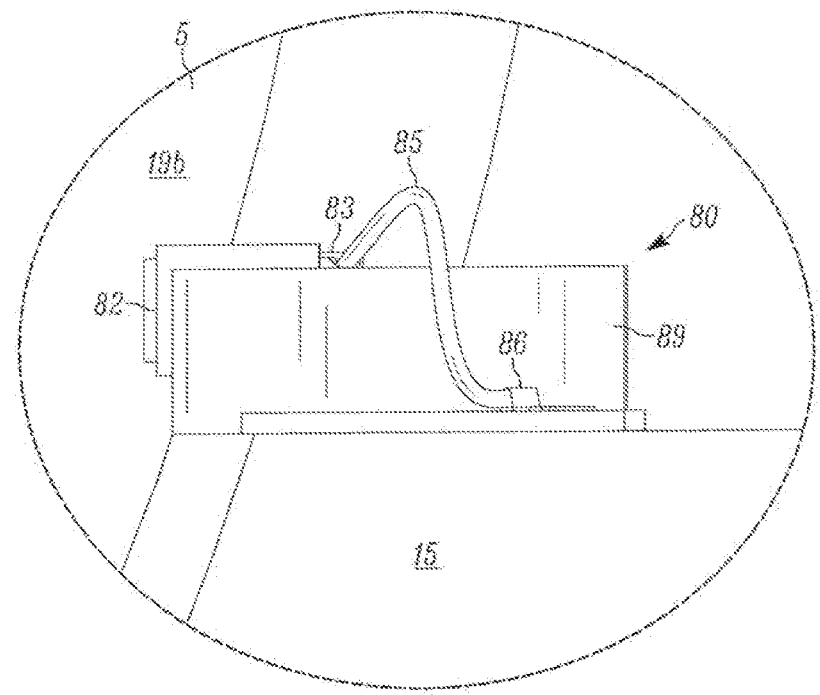
FIG. 5 illustrates an exemplary secondary electrostatic noise grounding system installed with respect to a nacelle frame.

As shown in FIG. 5, in order to complete the grounding pathway, a secondary ENGS 80 structure is provided on the nacelle-side of the main shaft 5. Specifically, the secondary ENGS 80 structure includes at least one conductive element 82 in direct physical contact with a conductive surface of the nacelle-side 19b of the main shaft 5 and a conductive pathway 85 directing current to the nacelle frame 15. In the exemplary embodiment shown, the conductive pathway 85 is a wire secured to the nacelle frame 15 by the bolt 86. The conductive element 83 is held in place by holder 83 which is secured to the nacelle frame 15 by secondary ENGS 80 frame 89. In a preferred embodiment, the nacelle frame 15 includes two secondary ENGS 80, each secured to the nacelle frame 15 and with a conductive element 82 in direct physical contact with the nacelle-side 19b of the main shaft 5.

Because the main shaft 5 rotates relative to the secondary ENGS 80 which is secured to the nacelle frame 15, in some embodiments, the main shaft 5 includes a conductive band, such as a ring of copper or other conductive material retrofitted to the nacelle-side 19b of the main shaft 5 at the location the conductive element 82 will contact the main shaft 5 as it rotates. In other embodiments, for example if the main shaft 5 is made of a conductive or semi-conductive material, the conductive band may be a portion of the main shaft 5 from which paint and dirt has been removed to provide a clean surface.

Once conducted to the nacelle frame 15, the electric current is safely conducted to ground by the tower 1.

Because wind turbines 100 experience lightning strikes, and the ENGS 70/secondary ENGS 80 provide a conductive path for electrical current, it is preferable that the components of the ENGS 70 and secondary ENGS 80 be rated lightning protection components. In an embodiment, for example, the components of the ENGS 70 and secondary ENGS 80 are rated Class 2 components or rated for 150 kAmps peak current.

In the exemplary embodiments illustrated, reference is made to a single blade 2 of a wind turbine which is fitted with a single ENGS 70. It is to be understood that each blade 2 of a wind turbine may be fitted, with a single or multiple ENGS 70. Preferably, a single ENGS 70 is secured to the blade housing 12 or blade bearing housing bolted connection X of each blade 2.

Figure 6:
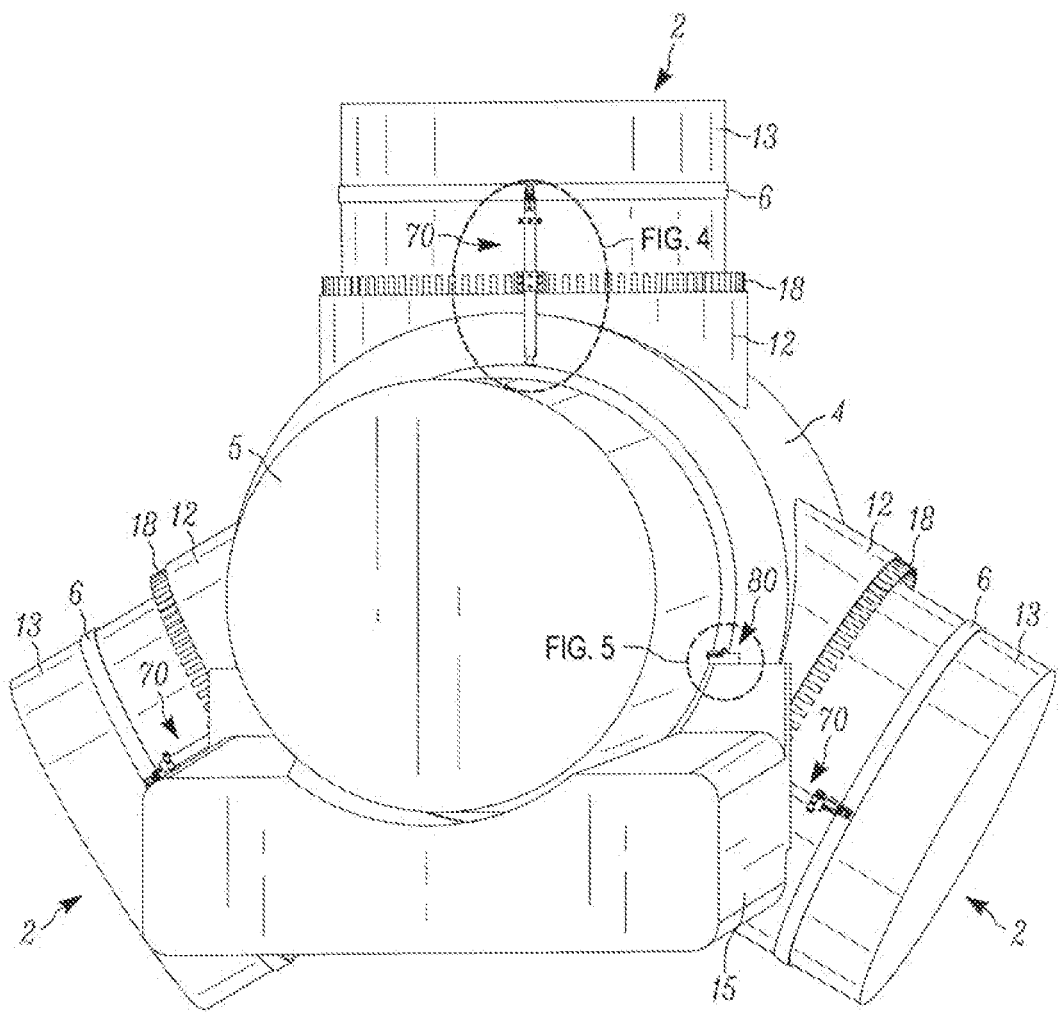
FIG. 6 illustrates both an exemplary electrostatic noise-grounding system and an exemplary secondary electrostatic noise grounding system installed in a wind turbine.

FIG. 6 illustrates an exemplary ENGS 70 and secondary ENGS 80 installed together in a wind turbine 100 such as that shown in FIG. 1. Each of the three blades 2 includes an ENGS 70 secured to the blade bearing housing boiled connection 18 such that a first conductive element 52 is in direct physical contact with the conductive bands 6, which are shown in FIG. 6 as bands of copper encircling the blades 2 at the blade root 13. The second conductive element 68 of each ENGS 70 is in direct physical contact with the hub root 4. The nacelle frame 15 includes two secondary ENGS 80 secured on either side of the nacelle frame 15. In the view shown, however, only a single secondary ENGS 80 is visible.

Figure 7:
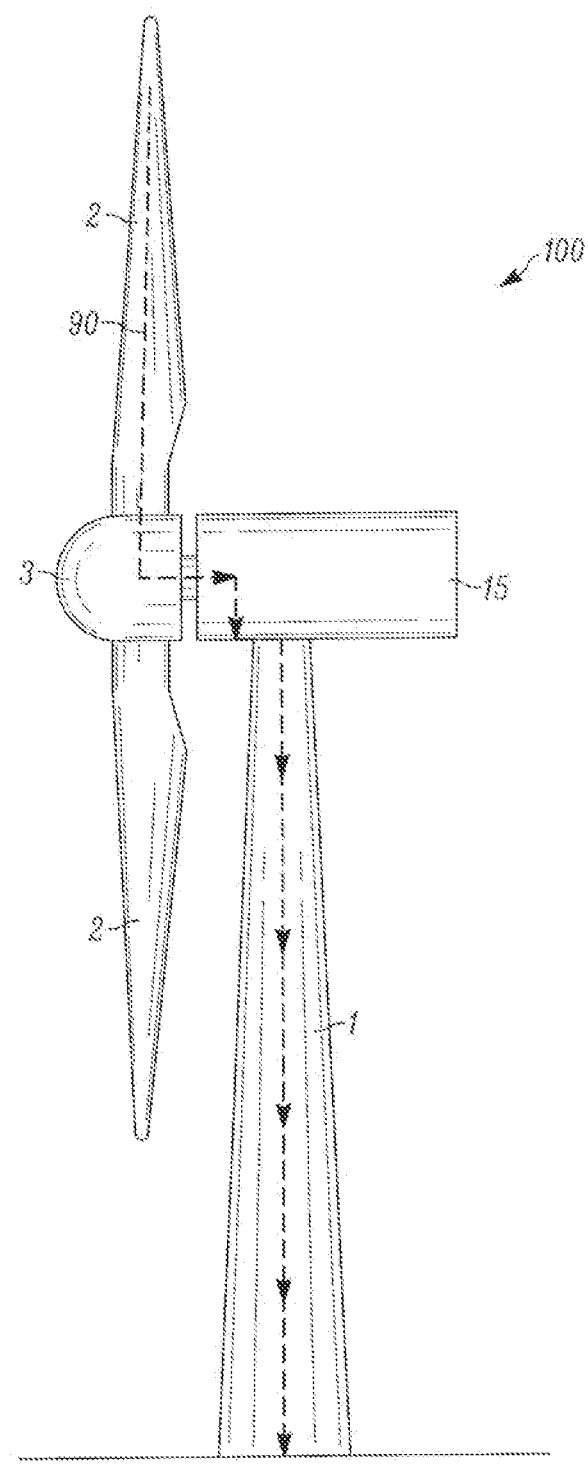
FIG. 7 illustrates the flow of electrostatic current through a wind turbine using an electrostatic noise grounding system and secondary electrostatic noise grounding system.

FIG. 7 is a schematic of a complete wind turbine 100 showing the path of electric current first through the ENGS 70 and then through secondary ENGS 80 and the wind turbine 100 to the ground. As illustrated, as static builds up in the blades 2, the current 90 is conducted through the main shaft 5 to the secondary ENGS 80. The secondary ENGS 80 directs the current 90 through the nacelle frame 15 to the tower 1 and into the ground. In some embodiments, the tower 1 may be equipped with conductive pathways specifically designed to conduct current to a specified grounding structure associated with the tower 1.

In an embodiment, a method of reducing electrostatic noise in a wind turbine is provided. The method includes a first step of directing electrostatic current horn a blade of the wind turbine to a hub root and through a main shaft of the wind turbine and a second step of directing the electrostatic current from the main shaft of the wind turbine to a nacelle frame of the wind turbine.

In an embodiment, the step directing electrostatic current from a blade of the wind turbine to a hub root and through a main shaft of the wind turbine includes providing an electrostatic noise grounding system, such as described herein, and directing current from a blade of the wind turbine to the hub root and through the main shaft via the ENGS. In an embodiment, the ENGS includes an insulated rod having a first end and a second end, a conductive core passing through the insulated rod, a first conductive element connected to the first end of the insulated rod, and a second conductive element connected to the second end of the insulated rod, and the ENGS is secured to the blade bearing housing or blade bearing housing bolted connection of the blade such that the first conductive element is in direct physical contact with at least a portion of the surface of the blade (e.g., blade root) and the second conductive element is in direct physical contact with at least a portion of the surface of the hub root. The step of directing current to the main shaft through the ENGS therefore includes directing current from the blade through the first conductive element, conductive core, second conductive element and hub root.

In an embodiment, the step of directing the electrostatic current from the main shaft of the wind turbine to the nacelle frame of the wind turbine includes providing a secondary ENGS comprising a conductive element in direct physical contact with at least a portion of the surface of the main shaft on the nacelle-side of the shaft and a conductive pathway in direct physical contact with the micelle frame, and directing the current from the main shaft through the conductive element and conductive pathway to the nacelle frame.

It shall be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A wind turbine rotor including a plurality of blades and a hub root, wherein at least one blade is provided with at least one electrostatic noise grounding system, wherein the electrostatic noise grounding system comprises:
    an insulated rod having a first end and a second end,
    a conductive core passing through the insulated rod,
    a first conductive element connected to the conductive core at the first end of the insulated rod, and
    a second conductive element connected to the conductive core at the second end of the insulated rod,
    wherein the electrostatic noise grounding system is secured to a portion of the wind turbine rotor such that the first conductive element is in direct physical contact with at least a portion of the surface of the at least one blade and the second conductive element is in direct physical contact with at least a portion of the surface of the hub root.

2. The wind turbine rotor of claim 1, wherein the first conductive element is connected to the first end of the insulated rod by a step bracket.

3. The wind turbine rotor of claim 1, wherein the at least one blade includes a conductive band around the surface of the blade and wherein the first conductive element is in direct physical contact with at least a portion of the conductive band.

4. The wind turbine rotor of claim 1, wherein the first and second conductive elements are carbon brushes.

5. The wind turbine rotor of claim 1, wherein the electrostatic noise grounding system further includes a support collar which secures the electrostatic noise grounding system to the wind turbine rotor.

6. The wind turbine rotor of claim 1, wherein each blade is joined to the hub root at a blade bearing, the blade bearings including a blade bearing housing and a blade bearing housing bolted connection.

7. The wind turbine rotor of claim 6, wherein the electrostatic noise grounding system is secured to the wind turbine rotor at a portion of the blade bearing.

8. The wind turbine rotor of claim 7, wherein the electrostatic noise grounding system is secured to the wind turbine rotor at the blade bearing housing bolted connection.

9. The wind turbine rotor of claim 1, wherein each of the plurality of blades is provided with an electrostatic noise grounding system.

10. A wind turbine comprising:
   a rotor comprising a plurality of blades joined to a hub root;
   a nacelle frame;
   a main shaft connected to the hub root and extending between the rotor and nacelle frame; and
   at least one electrostatic noise grounding system comprising
      an insulated rod having a first end and a second end,
      a conductive core passing through the insulated rod,
      a first conductive element connected to the conductive core at the first end of the insulated rod, and
      a second conductive element connected to the conductive core at the second end of the insulated rod,
   wherein the electrostatic noise grounding system is secured to a portion of the rotor such that the first conductive element is in direct physical contact with at least a portion of the surface of the at least one of the blades and the second conductive element is in direct physical contact with at least a portion of the surface of the hub root.

11. The wind turbine of claim 10, wherein each blade is joined to the hub root at a blade bearing, the blade bearings comprising a blade bearing housing and a blade bearing bolted connection, and wherein the electrostatic noise grounding system is secured to the rotor at a portion of the blade bearing.

12. The wind turbine of claim 11, wherein the electrostatic noise grounding system is secured to the rotor at the blade bearing housing bolted connection.

13. The wind turbine of claim 12, wherein the electrostatic noise grounding system further includes a support collar which secures the electrostatic noise grounding system to the blade bearing housing bolted connection.

14. The wind turbine of claim 10, wherein the first conductive element of the electrostatic noise grounding system is connected to the first end of the insulated rod by a step bracket.

15. The wind turbine of claim 13 comprising at least one electrostatic noise grounding system for each of the plurality of blades.

16. The wind turbine of claim 15, wherein each blade includes a conductive band around the surface of the blade and wherein the first conductive element of each electrostatic noise grounding system is in direct physical contact with at least a portion of a respective conductive band.

17. The wind turbine of claim 10, wherein the first and second conductive elements are carbon brushes.

18. The wind turbine of claim 10 further comprising a secondary electrostatic noise grounding system comprising a conductive element in direct physical contact with at least a portion of the surface of the main shaft on the nacelle-side of the shaft and a conductive pathway in direct physical contact with the nacelle frame.

19. An electrostatic noise grounding system for use with a wind turbine having a rotor with a plurality of blades and a hub root, the electrostatic noise grounding system comprising:
   an insulated rod having a first end and a second end,
   a conductive core passing through the insulated rod,
   a first conductive element connected to the conductive core at the first end of the insulated rod, and
   a second conductive element connected to the conductive core at the second end of the insulated rod,
   wherein the electrostatic noise grounding system is configured to secure to a portion of a the rotor such that the first conductive element is in direct physical contact with at least a portion of the surface of at least one of the blades and the second conductive element is in direct physical contact with at least a portion of the surface of the hub root.

20. An electrostatic noise grounding system in combination with a wind turbine, the combination comprising:
   a wind turbine comprising
      a rotor having a plurality of blades joined to a hub root, and
   the electrostatic noise grounding system comprising
      an insulated rod having a first end and a second end,
      a conductive core passing through the insulated rod,
      a first conductive element connected to the conductive core at the first end of the insulated rod, and
      a second conductive element connected to the conductive core at the second end of the insulated rod,
   wherein the electrostatic noise grounding system is configured to secure to a portion of a rotor such that the first conductive element is in direct physical contact with at least a portion of a surface of at least one of the blades of the wind turbine and the second conductive brush is in direct physical contact with at least a portion of a surface of a hub root of the wind turbine.

21. The electrostatic noise grounding system of claim 19, wherein each of the blades is joined to the hub root at a blade bearing, the blade bearings comprising a blade bearing housing and a blade bearing bolted connection, and wherein the electrostatic noise grounding system is secured to the rotor at a portion of the blade bearing.

22. The electrostatic noise grounding system of claim 21, wherein the electrostatic noise grounding system is secured to the rotor at the blade bearing housing bolted connection.

23. The electrostatic noise grounding system of claim 20, wherein each of the blades is joined to the hub root at a blade hearing, the blade bearings comprising a blade bearing housing and a blade bearing bolted connection, and wherein the electrostatic noise grounding system is secured to the rotor at a portion of the blade bearing.

24. The electrostatic noise grounding system of claim 19 wherein the second conductive element is threaded into the conductive core at the second end of the insulated rod.

25. The electrostatic noise grounding system of claim 20 wherein the second conductive element is threaded into the conductive core at the second end of the insulated rod.

26. A method of reducing electrostatic noise in a wind turbine comprising:
   providing an electrostatic noise grounding system comprising an insulated rod having a first end and a second end, a conductive core passing through the insulated rod, a first conductive element connected to the first end of the insulated rod, and a second conductive element connected to the second end of the insulated rod, wherein the electrostatic noise grounding system is secured to a portion of a rotor of the wind turbine such that the first conductive element is in direct physical contact with at least a portion of the surface of the blade and the second conductive element is in direct physical contact with at least a portion of the surface of the hub root;
   directing electrostatic current from a blade of the wind turbine to the hub root through the first conductive element, conductive core, and second conductive element;

directing the electrostatic current from the hub root through the main shall; and directing the electrostatic current from the main shaft of the wind turbine to a nacelle frame of the wind turbine.

* * * * *